United States Patent [19]
Box et al.

[11] Patent Number: 5,368,059
[45] Date of Patent: Nov. 29, 1994

[54] PLURAL COMPONENT CONTROLLER

[75] Inventors: Gary W. Box, Golden Valley, Minn.; Lawrence S. Kelly, Bolingbrook, Ill.

[73] Assignee: Graco Inc., Minneapolis, Minn.

[21] Appl. No.: 926,817

[22] Filed: Aug. 7, 1992

[51] Int. Cl.$^5$ ............................................. G05D 11/13
[52] U.S. Cl. .................................... 137/3; 137/101.21
[58] Field of Search ............... 137/3, 101.19, 101.21, 137/114

[56] References Cited

U.S. PATENT DOCUMENTS

| | | | |
|---|---|---|---|
| 3,036,585 | 5/1962 | Shawhan | 137/101.19 |
| 3,272,217 | 9/1966 | Young | 137/101.19 |
| 3,474,815 | 10/1969 | Beahm et al. | 137/101.19 |
| 4,006,752 | 2/1977 | De Vale | 137/101.21 |
| 4,294,277 | 10/1981 | Szeliga | 137/101.19 |
| 4,345,612 | 8/1982 | Kondi et al. | 137/101.19 |
| 4,526,188 | 7/1985 | Olsson | 137/3 |
| 4,681,530 | 7/1987 | Huber | 431/89 |
| 5,029,100 | 7/1991 | Young et al. | 364/479 |

FOREIGN PATENT DOCUMENTS 0116879 2/1984 European Pat. Off. .

*Primary Examiner*—Robert G. Nilson
*Attorney, Agent, or Firm*—Douglas B. Farrow

[57] ABSTRACT

This invention is useful in a plural component system which utilizes sequential metering of multiple fluids. In such a system for dispensing component fluids such as paint, the controller dispenses a given amount of a first fluid, and then part way through dispensing of the second fluid, calculates the amount of the second fluid required in view of the actual amount of the first fluid dispensed and then dispenses that amount. The desired tolerance maybe subtracted from the amount of second fluid dispensed so that the overrun which always takes place from the valves on the second fluid will place the mixture in the middle of the range for the dispensed fluid. During subsequent cycles, the ratio is checked in view of the actual amounts dispensed and an alarm set off if the actual ratio falls outside of tolerance.

2 Claims, 2 Drawing Sheets

PLURAL COMPONENT CONTROLLER

BACKGROUND OF THE INVENTION

Devices for dispensing plural component materials have become increasingly popular in recent years, as such materials have assumed more widespread usage in industry. As used herein, a catalyst (or first fluid) is mixed with a resin (or second fluid). While the terms catalyst and resin are used for purposes of convenience in reference, it is understood that other plural component systems may be utilized which might not normally utilize such terminology.

In dispensing and mixing such fluids, it is normally desired that they be dispensed in a fixed predetermined ratio which may be from all the way from 1:1 all the way up to 20:1. In more traditional systems, both fluids are metered simultaneously. Typically the flow on one side takes place at a relatively constant uncontrolled rate while the flow on the other side is varied to maintain the desired ratio. Also well known are mechanical systems, whereby two pumps are mechanically linked to produce a consistent mixture.

Also known are systems such as those sold under the PRECISION-MIX trademark by the assignee of the instant invention and generally described in European patent number 116879. In such systems, the two fluids to be dispensed both have a flow meter and a valve associated with them. A fixed amount of the first fluid is dispensed into a mixer and then a fixed amount of the second fluid is dispensed into the mixer, whereupon the process is repeated.

Such systems utilizing sequential metering work well but become less than accurate when used at higher flow rates. In particular, one of the downfalls of such systems results from the fact that the valves which are used to shut off flow do not have instantaneous response. Thus if the first fluid valve has dispensed fluid for 20 counts of the first fluid flowmeter and then ordered to close, several additional counts will probably flow through the valve before flow actually stops.

In the prior art devices, the only correction which takes place is that the counts representing the overrun are subtracted from the subsequent cycle of the same fluid. For example, if the first fluid normally dispenses 20 counts worth of material and the overrun amount to 2 counts, during the subsequent cycle, the two count overrun would subtracted from the normal amount and the valve would be ordered to dispense 18 counts.

SUMMARY OF THE INVENTION

It is therefore, an object of this invention to produce a plural component dispensing system which is capable of producing accurate mixtures at relatively high flow rates and which may be easily operated.

The plural component system of the instant invention is designed for use with flow meters which have an output of a pulse stream. Each pulse or count corresponds to a given amount of fluid which passes through the flowmeter. The amount may be an ounce, a gallon, or any other chosen unit of measurement or fraction thereof. For the sake of consistently, the term "count" will be used exclusively to refer to a volume herein.

A volumetric flowmeter such as gear meter is placed in each of the two fluid streams. The counts from the flowmeter are routed to a digital controller. A valve is controlled by a signal from the digital controller and is placed between each fluid stream and a mixing chamber.

The digital controller first computes the optimum volume from each stream required to provide the desired ratio. The valve on the first material opens allowing the optimum computed amount of the first material to flow into the mixing chamber whereupon the first valve is turned off. Since the valves cannot operate instantaneously, when each valve turns off, some additional material is dispensed and is referred to herein as overrun.

When the first valve turns off, the digital controller subtracts from the amount dispensed of the first material the amount of overrun from the previous cycle. Similar correction occurs for the second valve and material. When the second material valve turns on, after roughly half of its optimum value has been dispensed, the digital controller corrects the amount of the second material dispensed as noted previously and hence computes the minimum amount of the second material which must be dispensed to get the ratio between the limits set by the desired ratio and the predetermined tolerance. This value becomes the new target for the second material which is still being dispensed. Thus when the valve on the second material shuts off, the ratio for that second material cycle is at the minimum and any overrun of the second material dispensed as the valve is closing pushes the ratio to the desired value in the middle of the range.

At the conclusion of each dispense of the first material, the actual ratio for the previous first and second material dispense cycle is computed. This ratio is then compared with the limits computed from the desired ratio and the allowable tolerance to see if any alarms are necessary.

The system then continues in this manner recalculating the proper target for the second material dispensed halfway through the second material dispense based on the actual first material dispense amount. Since the digital controller knows the volume of overrun of both materials, it can now further correct the target of material of the second material so that the ratio comes out exactly.

By utilizing this method of dispensing, each first and second material dispense cycle is guaranteed to be greater than the minimum ratio desired. Only an exceedingly high amount of overrun in the dispense of the second material will cause the ratio to exceed the maximum ratio desired. Since the overshoot of the second material is a smaller fraction of the amount of the second material dispensed as higher ratios are requested, accuracy actually improves with increasing ratio. Any change in overshoot of the first material due to change in flow rate will be compensated immediately in the next dispense of the second material resulting in maintaining ratio over a higher flow range rate and higher ratios then previous art.

These and other objects and advantages of the invention will appear more fully from the following description made in conjunction with the accompanying drawings wherein like reference characters refer to the same or similar parts throughout the several views.

A BRIEF DESCRIPTION OF THE DRAWINGS

DESCRIPTION OF THE PREFERRED EMBODIMENT

Figure 1:
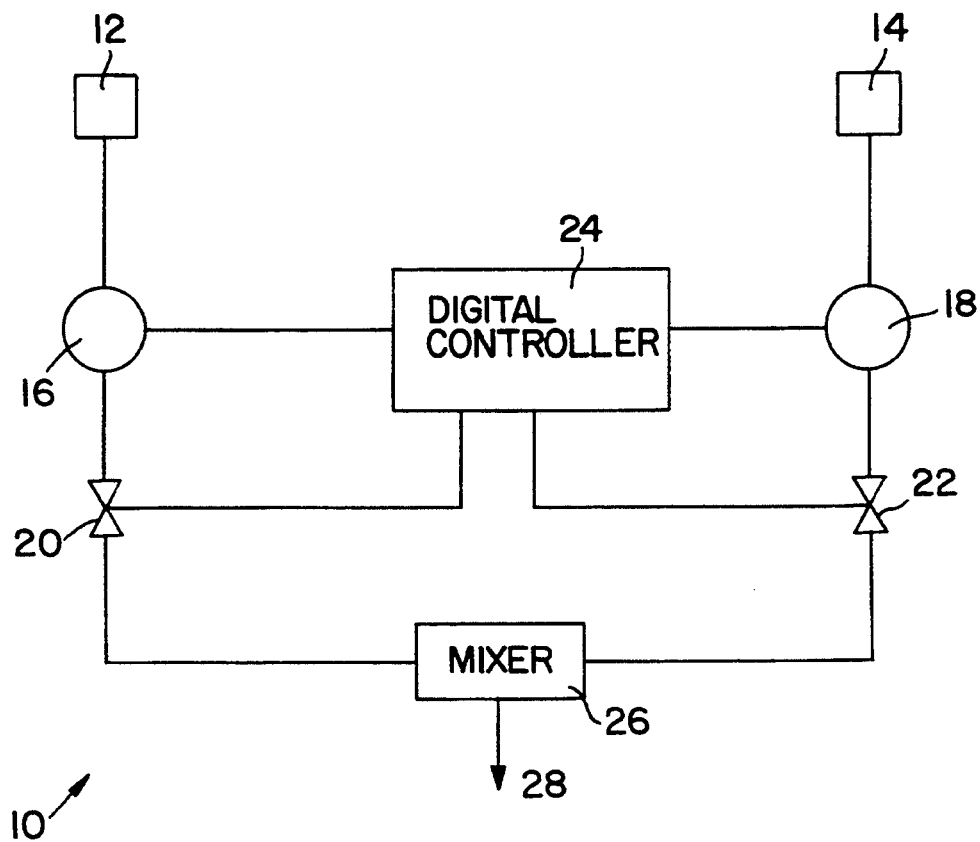
FIG. 1 is a schematic view showing the dispensing system of the instant invention.

As shown in FIG. 1, the instant invention, generally designated 10, is provided with first and second sources of pressurized fluid 12 and 14 respectively. The fluid sources lead to first and second flow meters 16 and 18 respectively and hence to first and second control valves 20 and 22. The outlets of the control valves 20 and 22, lead to mixer 26, and the output 28 of mixer 26 provides the mixed fluid to a spray gun or the like. The digital controller 24 is connected to first and second flow meters 16 and 18, as well as first and second valves 20 and 22.

Figure 2:
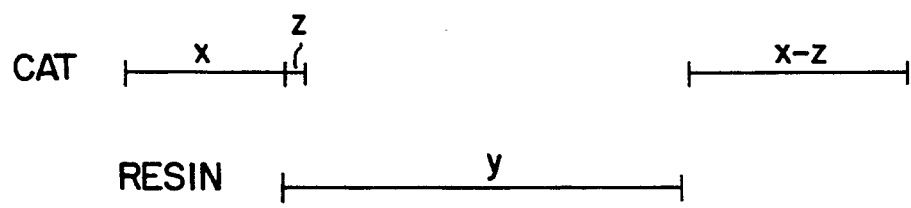
FIG. 2 shows a dispense sequence of the prior art type devices.

In operation then, FIG. 2 illustrates how prior art systems work and will be used as a basis for the invention, which shown in FIG. 3 and which will be later described. The catalyst or first material is dispensed for X counts. At the end of X counts, a signal is sent to the first valve 20 which is shut off and second valve of 22 opened whereupon Y counts of the second material or resin are dispensed. The overrun Z of the first material is then subtracted from the X count of the next cycle. A similar subtraction for overrun is done for the resin or second material, but not shown in FIG. 2. As shown in FIG. 2, the ratio of such a system will typically be Y:X.

Figure 3:
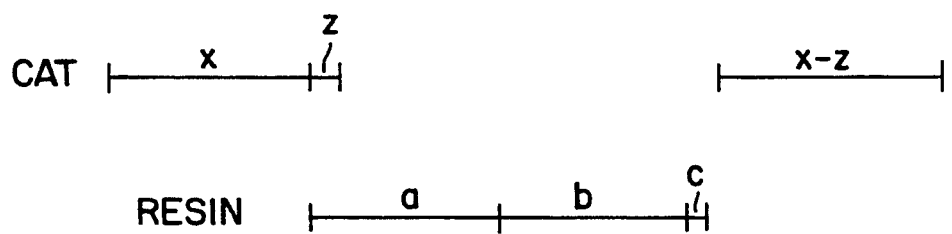
FIG. 3 shows the dispense sequence of the instant invention.

Turning to the instant invention in FIG. 3, the dispense cycle starts with dispensing of X counts of the first material or catalyst. At the end of X counts, the first valve 20 is shut off and second valve 22 opened. Again, the first material will typically have an overrun of Z counts. Once the second material flow has started, about halfway through the desired number of counts, controller 24 looks at the actual number of counts of the first material just dispensed (X+Z) and then calculates the number of counts of the second material necessary to produce the desired ratio Y:X. The controller then subtracts the predetermined tolerance which the user has entered into the controller (for example 10%) to produce a target number of counts for the second material which will be dispensed.

While the first and second materials can be reversed, in other words, the resin or material with the larger amount of material in the mixture may be dispensed first, having the material with the larger number of counts as the second material in the cycle makes it easier for the controller to perform the requisite calculation and correction.

At the end of the second dispense cycle of the first material, controller 24 looks back at the previous complete cycle and calculates to see whether the actual amounts of both materials dispensed (including overrun) is within the predetermined tolerance of the desired ratio. If it does not fall within this tolerance, an alarm may be sounded.

It is contemplated that various changes and modifications may be made to the controller without departing from the spirit and scope of the invention as defined by the following claims.

What is claimed is:

1. A method for metering a fluid having at least first and second components, each of said components having a meter and valve in the flow path thereof, said flow paths being joined at a mixer, and wherein it is desired to dispense in a predetermined ratio, said method comprising the steps of:

opening said first fluid valve and dispensing a first predetermined number of counts of said first fluid to form a first fluid cycle;

closing said first fluid valve;

opening said second fluid valve to form a second fluid cycle; measuring the overrun counts of said first fluid;

calculating the number of counts of said second fluid required to maintain said predetermined ratio relative to the sum of said first predetermined number and said first fluid overrun and then subtracting a predetermined tolerance to form a second fluid count; and closing said second fluid valve after said second fluid count has been dispensed to complete said second fluid cycle.

2. The method of claim 1 further comprising the step of calculating the actual ratio dispensed during the previous first and second fluid cycles and actuating an alarm if said actual ratio exceeds said predetermined ratio by more than said predetermined tolerance.

* * * * *